Aug. 29, 1933.  M. BUFFINGTON  1,924,635
METHOD OF MAKING A LAMINATED FABRIC
Filed Dec. 16, 1929  2 Sheets-Sheet 1

Inventor
MALCOLM BUFFINGTON.
By Fisher and Pedersen
Attorneys.

Aug. 29, 1933.   M. BUFFINGTON   1,924,635
METHOD OF MAKING A LAMINATED FABRIC
Filed Dec. 16, 1929    2 Sheets-Sheet 2

Inventor
MALCOLM BUFFINGTON.

By Fisher and Pedersen
Attorneys

Patented Aug. 29, 1933

1,924,635

UNITED STATES PATENT OFFICE 1,924,635

METHOD OF MAKING A LAMINATED FABRIC

Malcolm Buffington, Roselle Park, N. J., assignor to Lea Fabrics, Inc., Newark, N. J., a corporation of Delaware Application December 16, 1929
Serial No. 414,523

11 Claims. (Cl. 18—59)

This invention relates to a laminated or composite fabric and method of making the same, the said fabric having qualities which adapt it particularly for use in the automobile industry.

The product of my invention comprises a combination of two fabrics united by an intermediate layer of a cushioning binding material, the top fabric being woven in imitation of a tapestry carpeting, preferably of the form commercially known as "tapestry cloth", which is made of jute fibres; and the base fabric being preferably burlap, and the two fabrics being preferably united or combined by means of an intermediate layer of sponge rubber.

In tapestry carpeting heretofore made the softness of the product or "body" is obtained by the use of high loops, rendering the product expensive on account of the amount and cost of the material required. Furthermore, such material is not sufficiently resilient and does not have a sufficient permanent stiffness and rigidity. A certain amount of stiffness is generally given to such tapestry carpeting by sizing, but this property is lost as soon as the sized carpeting becomes wet. The product of my invention does not lose its resiliency and stiffness on becoming wet or damp, and possesses the most desired qualities of such tapestry carpeting, particularly the softness, pliability and high wearing qualities. The product has the distinct advantage, moreover, that it may be cut to any desired size or form without raveling, together with other advantages, as will be apparent to those skilled in the art.

In the making of the product of my invention, a top fabric, or "tapestry cloth", is preferably coated with a substantial amount of a rubber compound adapted to form sponge rubber, the fabric being preferably coated on one side, by means of a calender, for example. The base fabric or burlap is also preferably coated on one side with a light coating of the same rubber compound, the amount of material used being obviously dependent upon the degree of resiliency and body required in the final product. After the two fabrics have been coated on one side, they are doubled together and pressed into contact and cured preferably in the manner hereinafter described.

Among the objects of my invention are to produce a fabric product having a high degree of resiliency and softness, and which will retain its shape and form irrespective of moisture or dampness.

Another object of the invention is to provide a carpet material particularly adapted for automobile mats which may be rapidly manufactured at a low cost and which may be cut to any shape or perforated without raveling, thus avoiding waste of material and necessity of binding.

A further object of the invention is to provide a carpet material particularly adapted for automobile mats and similar uses having a high degree of insulation against sound and also against heat and cold, and which is adapted to be colored or printed to resemble more expensive products in appearance.

With these and other objects in view, the invention comprises various features hereinafter more fully described and particularly defined in the claims.

The preferred method of carrying out my invention will now be described in detail in connection with the accompanying drawings, in which.

Figure 1:
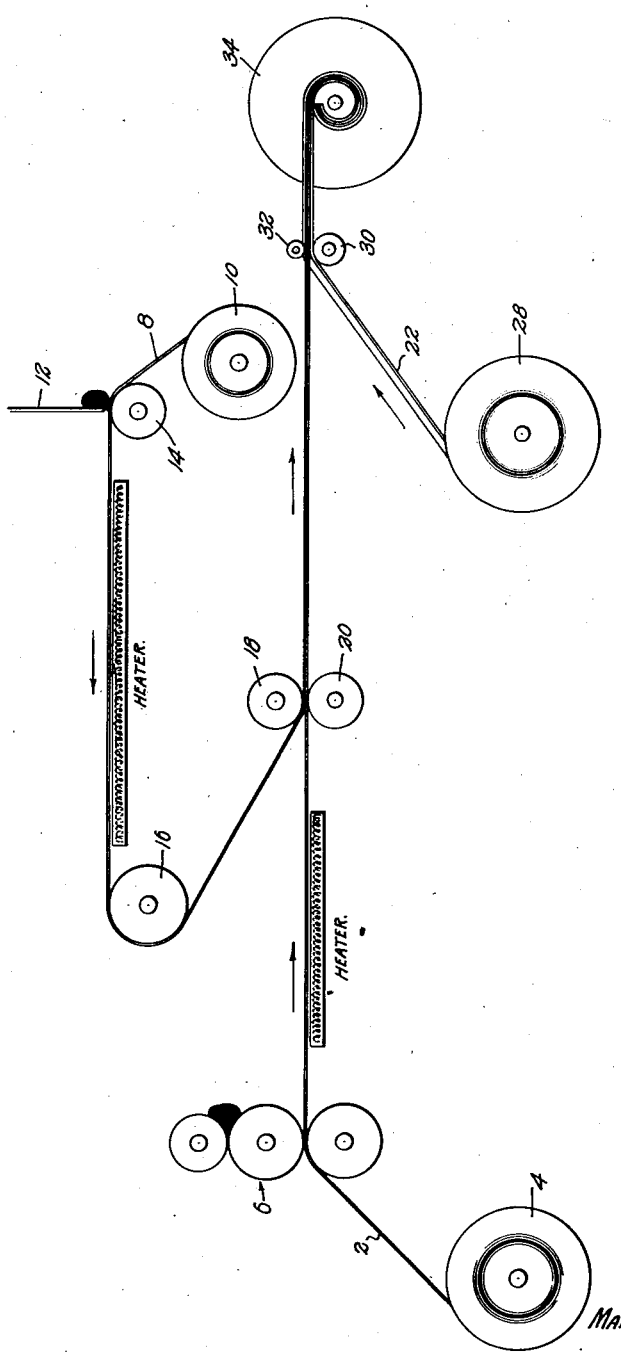
Fig. 1 is a view, more or less diagrammatic, illustrating the mode of carrying out my invention.

In carrying out the method of my invention, the top fabric or "tapestry cloth" 2, which is preferably employed, is passed from a suitable roll 4 through a calendar 6, for applying the rubber compound to one face or side of the fabric. The top fabric may, if desired, be dyed in piece before it is coated, or, if preferred, the top fabric or "tapestry cloth" may be dyed or printed after being combined with the base fabric, although I preferably treat the top fabric before coating.

While the rubber composition is preferably applied by means of a calender, it may obviously be applied to the fabric by any other suitable means, such as by a spreader or by spraying, or by a combination of these methods. The rubber composition preferably employed for this purpose is one adapted to form sponge rubber, such composition being well known, and containing the usual ingredient or ingredients, such as ammonium carbonate, for producing puffing action during vulcanization or curing of the rubber.

The base fabric, preferably burlap 8, which is to be combined with the top fabric, is preferably passed from a roll 10 into contact with a spreader 12 over a roll 14 for coating one side of the base fabric or backing material. The thickness of coating and penetration into the fibres may be regulated by means of a doctor blade as shown, which may be raised or lowered to control the thickness of the coating applied.

While in connection with the base fabric a sponge rubber compound may be used, it is to be understood that the base fabric, or burlap, may be coated with ordinary rubber cement not adapted for the formation of sponge rubber, the cement coating adhering to the sponge rubber coating on the top fabric when the material is combined in pressure contact, as will be hereinafter described. It will be understood that although the rubber cement material is preferably applied to the base fabric by means of a spreader which is particularly adapted for coating the material in the manner described, the cement material may be applied by spraying or in any other suitable manner to accomplish the desired purpose.

In order to unite the coated top fabric with the base fabric, the coated side of the backing material is preferably passed into contract with the coated side of the top fabric, the backing material being passed over a roller 16 and downwardly over a roller 18, at which point it is joined to the top fabric 2, the two fabrics passing between the rollers 18 and 20, which are held in pressure contact with any desired degree of pressure by means of springs, or other suitable means.

In order to obtain the desired spacing in the finished product between the top fabric and base fabric, a heavy canvas apron 22, having a width greater than the doubled fabric to be treated is preferably employed. This apron is preferably impregnated with pyroxylin or oxidized oil to render it impervious to gases and thus help in retaining the gases in the rubber compound during the curing operation. At the marginal portions or sides of the apron, preferably cemented thereto, are two longitudinal spacing members, 24 and 26, preferably comprising leather strips, which are spaced apart a sufficient distance to receive the doubled fabric between them, the strips having a thickness corresponding to the desired thickness of the finished product.

Figure 2:
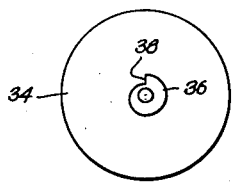
Fig. 2 is a side view in elevation of the roller or spool on which the doubled fabric may be wrapped for curing.
Figure 3:
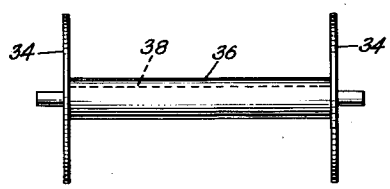
Fig. 3 is a view in elevation of the spool shown in Fig. 2.
Figure 4:
Fig. 4 is a cross sectional view of a form of apron adapted to be employed in curing the product, the combined fabric being shown in place between longitudinal strips or spacing elements, spaced apart a distance permitting the fabric product to be inserted between them.

The apron 22 is preferably passed from a roll 28 over a roller 30 into contact with the doubled fabric, the fabric being preferably guided under a roller 32 into contact with the apron into position between the spacing members. The apron carrying the doubled fabric may then be rolled so that during the curing operation the fabrics cannot become separated beyond a certain limit determined by the thickness or height of the spacing members 24 and 26. For this purpose, the doubled fabric carried by the apron is preferably wrapped onto a spool 34, shown more particularly in Figs. 2 and 3, the fabric when rolled being held on the spool between two folds or sections of the canvas apron, the folds being spaced apart by the longitudinal leather strips a distance corresponding to the thickness of the strips. After the doubled fabric has been wound onto the spool 34, the rolled-up material is preferably placed in a suitable metal casing, in which the material is confined to limit expansion during the curing operation. The casing containing the rolled material is preferably placed in an oven heated to the desired vulcanizing temperature, the material being cured or vulcanized while the gases evolved from the sponge rubber composition hold the fabric in expanded position in pressure contact with the walls or folds of the canvas apron.

Figure 5:
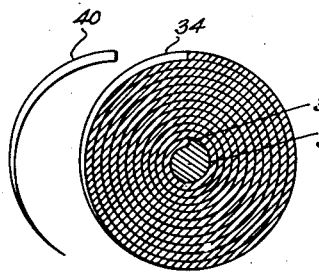
Fig. 5 illustrates the preferred form of the mandrel in the spool upon which the combined fabric product is wound during the curing operation, together with a filling section employed for obtaining a substantially cylindrical form in the completed roll.

The spool 34 preferably comprises a mandrel or core 36 having a surface forming a spiral in section, as shown, more particularly in Fig. 5. In winding the combined fabric and apron upon the mandrel, the end of the apron and fabric is placed against the vertical section or transverse part 38, the mandrel or spool being rotated in a clockwise direction, with reference to Fig. 1 of the drawings, whereby the material becomes wound thereon in a counter clockwise direction, the part 38 being preferably of a height or thickness corresponding substantially to the thickness of the spacing elements 24 and 26, whereby a compact winding is obtained in the final roll.

After the material is completely wound upon the mandrel 36 in the spool 34 as shown, the last turn obviously produces a deviation in the roll from the true cylindrical form. For convenience in handling, the roll is preferably restored to its true cylindrical form by means of a filling piece 40 (Fig. 5), having a length corresponding preferably to one half the circumference of the last turn, and a thickness at one end equivalent to the desired thickness of the finished product, being skived or progressively reduced in thickness toward the other end of the material. If desired, the length of the filling piece may correspond to the circumference of the completed roll, or a shorter length may obviously be employed in certain cases, as may be apparent to those skilled in the art.

Figures 6, 7:
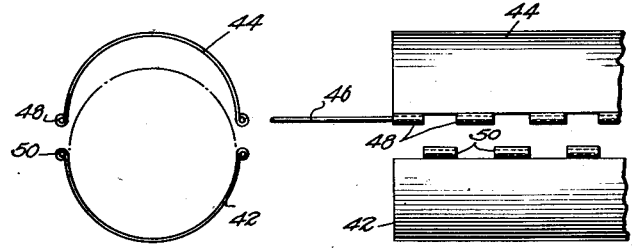
Fig. 6 is a vertical sectional view of a casing for enclosing the combined fabric product during vulcanization.
Fig. 7 is a side view in elevation of a portion of the cylindrical casing, showing the two semicylindrical metal covers slightly separated to illustrate the means for uniting the covers.
Figure 8:
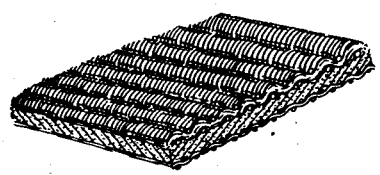
Fig. 8 is a view in perspective of the finished fabric product of my invention.

The roll thus completed and given a cylindrical form may then be enclosed, as above stated, in a casing, which preferably comprises two semi-cylindrical sheet metal covers 42 and 44, as shown more particularly in Figs. 6 and 7, the covers being preferably combined by means of rods 46 passing through the alternately rolled sections 48 and 50, serving to firmly bind the covers of the casing into a unit. The material enclosed in the casing is then heated in any suitable manner, preferably by placing the casing in an oven heated to a suitable temperature, heated air being passed through the oven until the desired cure is effected.

It will be apparent that during the curing operation the gases evolved in the rubber compound by means of the ammonium carbonate or other ingredient employed for the making of sponge rubber causes puffing of the rubber layer and causes the fabric members to be pressed into contact with the adjacent sections of the apron, being rigidly held in place within the casing by means of the casing walls, being also prevented from moving a substantial amount by means of the leather spacing members. After the desired curing or vulcanizing action has taken place, the material is withdrawn from the casing and may then be printed in any suitable manner.

Instead of curing the material upon a mandrel within a casing in the manner above described, the material might be pressed between heated platens spaced apart the thickness of the desired finished product, the platens being heated to the desired curing temperature. While this method might be used in certain instances, it is to be understood that a better product and better regulation is obtained by the improved method of curing as above specifically set forth.

While this invention has been described as a continuous operation, it will be apparent that various steps may be carried out wholly separately, instead of as a part of the continuous operation above described. In applying the rubber cement composition to the top fabric by means of a calender, as above described, a plurality of coats may be applied separately, each coat being preferably dried before the application of the succeeding coat. The coated top fabric may then be rolled in any suitable way and subsequently applied for the succeeding step of combining with the base fabric in the continuous process. It will be apparent, therefore, that the last coat to be applied to the top fabric is preferably made as a part of the continuous process above described.

Similarly, the cementing material may be applied to the base fabric as a separate operation, and a number of coats may be applied in any suitable manner, preferably by intermediate drying between the applications of the coating material. The base fabric, thus coated, may be rolled in any suitable manner and directly used for combining with the top fabric; or, if desired, the last coat may be applied to the base fabric immediately before combining with a top fabric, in the continuous process, as described. It is to be understood, however, that the coat is preferably dried, at least to a certain degree, before the base fabric is passed into contact with the top fabric, as is also the case with regard to the coating of the top fabric.

While the apron employed in connection with the curing operation is preferably made impervious to gases by means of a pyroxylin solution or similar coating material, it is not essential that the apron be made completely impervious, and it will be understood that the desired effect of curing, for the formation of sponge rubber, may be obtained by controlling the temperature of vulcanization and other factors, as will be apparent to those skilled in the art, to bring about the desired curing effect.

It is to be understood that various changes or modifications may be made in the product and method as above described without departing from the spirit or scope of the invention as set forth in the annexed claims.

Instead of applying the sponge rubber composition to the top fabric as described, it may obviously be applied to the base fabric, and a light coating of a sponge rubber might be then applied to the top fabric, whereby a product substantially similar to that described may be obtained. It is to be understood, however, that I prefer to employ the method above described in the making of the combined fabric product of my invention.

Having thus described the invention, what is claimed as new is:

1. A method of making a laminated fabric which comprises applying a thin coating of a rubber compound on one side of a textile top fabric of imitation tapestry carpet, applying a thin coating of a rubber compound on one side of a backing material, at least one of said rubber compounds being adapted to form sponge rubber, joining the coated sides of the said top fabric and backing material and vulcanizing said rubber compounds to permanently attach the said textile top fabric to the said backing material, forming a composite structure united by a thin layer of sponge rubber.

2. A method of making a laminated fabric which comprises applying a thin coating of a rubber compound on one side of a textile top fabric of imitation tapestry carpet, applying a thin coating of a rubber compound on one side of a backing material, at least one of said rubber compounds being adapted to form sponge rubber, joining the coated sides of the top fabric and backing material under pressure contact and vulcanizing the said rubber compounds while the said top fabric and backing material are held in place so as to limit the expansion of the said sponge rubber to obtain the desired limited thickness of the finished product, a composite structure united by a thin layer of sponge rubber.

3. A method of making laminated fabric which comprises applying a thin coating of a rubber compound on one side of a textile top fabric of "tapestry cloth", applying a coating of a rubber compound on one side of a base fabric, one of said rubber compounds having a composition adapted for the formation of sponge rubber, joining the coated sides of the said top fabric and base fabric, passing them into a relatively confined space between two walls which are spaced apart the thickness of the desired finished product, and heating the said product to the desired curing temperature to effect expansion of the sponge rubber composition, thereby forming a composite structure united by a thin layer of sponge rubber.

4. The method of making a laminated fabric product which comprises coating a top fabric with a sponge rubber composition by means of a calender, coating a base fabric of burlap with a vulcanizable rubber composition by means of a spreader, doubling the said fabrics to unite the coated sides of the said fabrics, rolling up the doubled fabric with an apron to form a roll in which the convolutions are in spaced relation and subjecting the said roll to a curing temperature whereby the evolved gases cause pressure contact of the fabrics with the adjacent portions of the apron, thus controlling the distance between the doubled fabrics in the finished product.

5. A method of making a laminated fabric product which comprises coating a top fabric with a sponge rubber composition, coating a base fabric with a sponge rubber composition, drying the coats applied to the top fabric and base fabric, passing the coated sides of the top fabric and base fabric into pressure contact, combining an apron having spacing elements with the said combined fabrics, tightly rolling the product for curing and vulcanizing the said product.

6. In a method of the kind described, the steps comprising passing an impervious apron associated with spacing elements into contact with the sponge rubber composition coated fabric product to be cured, rolling the combined material so that the said apron forms a continuous chamber containing the said product in which the walls are spaced by the said spacing elements, and in which the said product to be cured may expand only into contact with the adjacent apron walls, and subjecting the product to a vulcanizing temperature while confined in the said chamber.

7. In a method of the kind described, the steps comprise confining the material to be cured in a spiral chamber having substantially impervious top and bottom walls and lateral flexible spacing elements adapted to confine gases evolved during the curing operation in the said chamber and subjecting the product to vulcanization at an elevated temperature while confined in the said chamber.

8. In a method of making a laminated fabric product, the steps comprising passing a doubled fabric having an intermediate layer of vulcanizable sponge rubber composition onto a winding element in the form of a spiral in section, the rolls of material being spaced by means of an apron adapted to be tightly wound upon the said element, means for vulcanizing the said rubber composition and means for limiting the expansion of the doubled fabric during vulcanization to the walls of the said apron.

9. In a method of making a laminated fabric product, the steps comprising passing a doubled fabric to be cured onto an apron between spacing members, rolling the apron with the fabric thereon onto a mandrel, the surface of which is spiral in section, combining a skived strip with the end of the roll of material to form a substantially cylindrical surface, placing the roll within a metal casing and subjecting the material to a vulcanizing temperature.

10. In a method of making a laminated fabric product, the steps comprising passing a doubled fabric having an intermediate layer of sponge rubber composition therebetween onto an apron having spaced longitudinal strips thereon, forming a roll of compacted material therefrom in which the said spacing strips serve to space the convolutions of the said apron to permit a definite expansion of the said rubber composition, inserting the roll into a casing and subjecting the roll to a curing temperature to provide a product in which the fabrics are uniformly spaced apart.

11. In a method of making a laminated fabric product, the steps comprising passing a doubled fabric having an intermediate layer of sponge rubber material onto an apron between two spaced longitudinal leather strips, winding the apron and strips with the fabric product therebetween onto a mandrel, incorporating a skived strip with the roll to form a substantially cylindrical surface, and subjecting the said roll to a curing temperature whereby the evolved gases cause pressure contact of the fabrics with the adjacent portions of the apron, thus controlling the distance between the doubled fabrics in the finished product.

MALCOLM BUFFINGTON.